United States Patent Office 2,932,218
Patented Apr. 12, 1960

2,932,218

CONTROLLED SLIP DIFFERENTIAL

Robert C. Russell, Shaker Heights, Ohio, assignor to Eaton Manufacturing Company, Cleveland, Ohio, a corporation of Ohio Application September 13, 1957, Serial No. 683,849

9 Claims. (Cl. 74—711)

The present invention relates to a controlled slip differential to be used primarily in motor vehicles having spaced driving wheels. Structures heretofore known relating to the transfer of driving torque from a slipping to a non-slipping wheel have been of the friction type in which friction means are disengaged during non-slipping conditions and engaged during a slipping condition to transmit torque from the input pinion through the friction device to the non-slipping wheel. These known devices are complicated in structure and have not solved the overall problems which are presented in a differentiating device.

Conventional differentials are inadequate under adverse road or terrain conditions because when a situation is encountered in which one wheel slips with practically no resistance, the conventional differential transfers all the driving force to the slipping wheel. The ideal structure is one which performs the differentiating function while rounding curves, negotiating turns, etc, but which operates to provide some driving force to the non-slipping wheel under conditions wherein the other wheel has little or no tractive effort.

An object of this invention is to provide a controlled slip differential wherein driving torque is transmitted to a non-slipping ground engaging wheel when the other ground engaging wheel encounters a slipping condition.

Another object of this invention is to provide a controlled slip differential wherein the normal differentiating function is performed with little or no interference from the friction means.

Still another object is to provide a controlled slip differential having a structural simplicity approaching that of a conventional variety.

Yet another object is to provide a controlled slip differential wherein differential side gears are cammed away from driving pinions during certain operating conditions, thus preventing excessive tooth loading of the meshing pinions and side gears.

Still another object of this invention is to provide a differential which is relatively light, economical to manufacture, simple, and efficient.

Another object of this invention is to provide a differential which utilizes a minimum of special parts to accomplish the additional functions of a controlled slip differential device.

Still another object of this invention is to provide a novel means to absorb reaction thrust loads of a controlled slip differential device.

These and other objects and advantages will become apparent from the following description in which reference is made to the drawings, in which.

Figure 1:
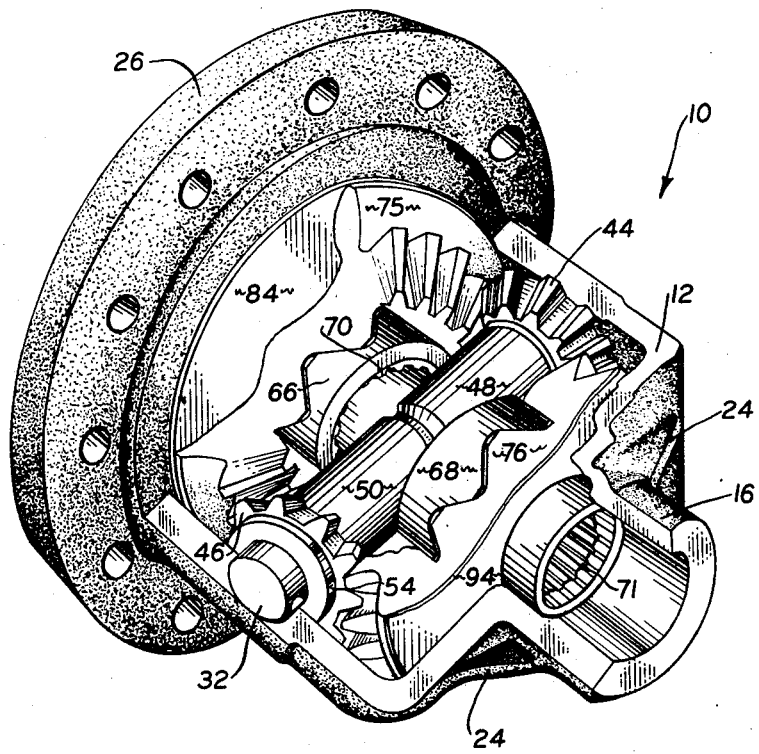
Figure 1 is a perspective cutaway view of the novel control slip differential disclosed herein.
Figure 2:
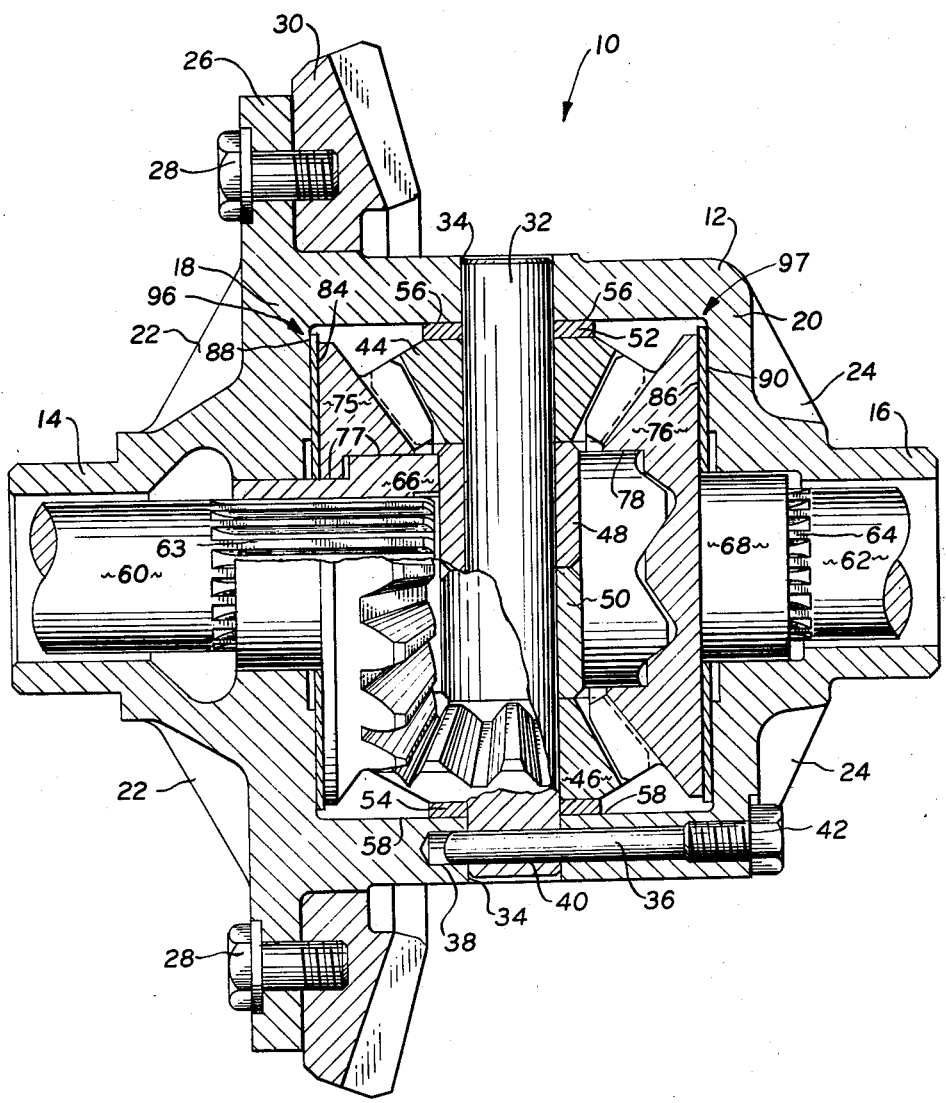
Figure 2 is a partial cross-section of the structure shown in Figure 1.

Briefly, the novel device disclosed herein is comprised of a conventional input pinion meshing with an input ring gear attached to a differential housing. The differential housing is provided with opposed cutout portions disposed intermediate the end walls of the housing to facilitate positioning and assembly of the parts to be disposed within the housing. The differential housing is provided with central openings in the end walls to receive inner ends of spaced axle shafts adapted to be connected to driving wheels. A single cross pin is carried by the differential housing and positioned intermediate the housing end walls normal to the axis of the driving axles. A pair of spaced driving pinions are journalled on the cross pin and are engageable with a pair of side bevel gears which are in turn co-axial with the driving axles. A stepped cam sleeve having a cam surface thereon is interposed between each side bevel gear and driving axle and is in splined driving relationship with each of the driving axles. The side bevel gears are also provided with matching or mating surfaces in a manner such that torque is transmitted from the side bevel gear to the driving axle through the cam surfaces. The aforementioned cross pin is provided with a pair of spacer sleeves journalled on the cross pin and positioned in a manner to function as reaction means for the stepped sleeves splined to the axle shafts. The differential housing is provided with inner end wall surfaces positioned adjacent the lateral walls of the side bevels remote from the gear teeth which are adapted to be frictionally engaged when the side bevel gears are moved longitudinally with respect to the stepped sleeves by the action of the cam means. The reactive force which is created during this operating condition is transmitted from the stepped sleeve to the aforementioned spacer sleeves and through the cross pin to the differential housing.

Under normal operating conditions, torque is transmitted to the differential housing from the input pinion and input ring gear to the driving pin and driving pinions. This force is transmitted to the side bevel gears through the meshing teeth and in turn to the stepped sleeves through the cam surfaces. Under normal conditions, the axles resist rotation due to the loading thereon and the side bevel gears are thus moved longitudinally with respect to the stepped sleeves due to the action of the cam surfaces. This longitudinal movement results in the engagement of the side bevel gears with the inner end surfaces of the differential housing and torque from the differential housing is thus transmitted to the side gears through the frictional connection as well as through the meshing gear teeth. When the side gears are moved into frictional engagement with the differential housing, the reactive force which is thus created is transmitted through the stepped sleeves to the spacer sleeves journalled on the cross pin. It is to be also noted that frictional engagement between the side gears and differential housing is effected by moving the side gears away from the driving pinions. This functional relationship prevents excessive loading of the gear teeth and consequent undue wear thereon.

Referring to the drawing for a more detailed description of the device, a controlled slip differential 10 is comprised of a unitary housing 12 having integral sleeve portions 14 and 16 formed in end walls 18 and 20, respectively. Webbed portions 22 and 24 are formed between the housing end walls and the sleeves 14 and 16, respectively, to provide a stronger unitary housing. A flanged portion 26 is provided with a plurality of holes having bolts 28 disposed therein and adapted to connect an input ring gear 30 with housing 12. An input pinion gear (not shown) which is driven by the vehicle propeller shaft (not shown) is adapted to mesh with input ring gear 30 and provide a source of power for the differential unit.

A cross pin 32 is positioned in holes 34 which are provided in housing 12. Cross pin 32 is held in position by a locking pin 36 which is receivable in hole 38 in differential housing 12 and in a hole 40 in the cross pin 32. The bolt 42 is threadingly engaged with housing 12 to maintain locking pin 36 in an assembled locking position. A pair of spaced differential pinions 44 and 46 are journalled on cross pin 32 and maintained in a predetermined axial position with respect to cross pin 32 by spacer sleeves 48, 50, and thrust washers 52, 54. Housing 12 is provided with appropriate faced-off or flat surfaces 56 and 58 so as to provide a flat thrust surface for washers 52 and 54, respectively. It is to be noted that other clutch configurations can be utilized such as a multiple disc clutch or a conical clutching surface and the invention is not limited to the illustrated configuration.

Inner end portions of a pair of spaced axle shafts 60 and 62 are receivable within housing 12 and provided with splined portions 63 and 64, respectively. A pair of cam sleeves 66 and 68 are provided with respective inner splines 70 and 71 which cooperate respectively with splines 63 and 64 to rotatably connect cam sleeves 66 and 68 with axle shafts 60 and 62, respectively. A cam contour 72 is provided on cam sleeve 66 and a similar cam contour 74 is provided on cam sleeve 68.

A pair of axially spaced side bevel gears 75 and 76 are disposed in meshing engagement with drive pinions 44 and 46 respectively, and are journalled at 77 and 78 on cam sleeves 66 and 68, respectively, thus providing an elongated bearing surface for the side bevel gears to prevent cocking or binding during longitudinal movement of the gears with respect to the cam sleeves and are provided with cam contours 80 and 82 in cooperative relationship with cam contours 72 and 74 of cam sleeves 66 and 68, respectively. Each of the side bevel gears 75 and 76 is provided with back-wall surfaces 84 and 86, respectively, disposed adjacent inner wall surfaces 88 and 90 of housing end walls 18 and 20, respectively. Freely floating friction discs 92 and 94 are interposed between surfaces 84, 88, and 86 and 90, respectively. These structural elements will hereinafter be referred to as friction clutches 96 and 97.

The novel cooperative relationship between spacer sleeves 48 and 50 and cam sleeves 66 and 68, respectively, is such that tagentially contacting thrust surfaces 98 and 99 provide rolling as opposed to sliding contact between the spacer sleeves and the cam sleeves during differential movement of the side gears. This arrangement greatly reduces the wear between these parts, thus insuring long life and smooth and quiet operation.

In order to more clearly understand the operation of this device, typical operating conditions are set forth as follows.

When the vehicle is operating under normal road conditions, spaced driving wheels provide tractive effort in order to move the vehicle. During this condition, the input driving means (not shown) drives input ring 30 and rotates housing 12, thus imparting rotation to the cross pin 32 and driving pinions 44 and 46 about the axle shaft axis. If the vehicle is propelled in a straight ahead direction and the coefficient of friction at the ground engaging point of the wheels is approximately the same, the drive pinions 44 are translated about the axle shaft axis with no appreciable rotation of the drive pinions about the axis of cross pins 32. Such movement imparts rotation to side bevel gears 75 and 76 which in turn drive cam sleeves 66 and 68 through cam contours 80, 72 and 82, 74. Cam contours 80, 72 and 82, 74 are disposed at a cam angle such that the rotary force transmitted by side bevels 75 and 76 is divided into an axially directed component and a rotative component. The axial component results in longitudinal movement of side gears 75 and 76 into frictional engagement with floating friction discs 92 and 94 which in turn, engage inner wall surfaces 88, 90, thus energizing friction clutch assemblies 96 and 97. Therefore, torque is transmitted to axle shafts 60 and 62 through the friction clutches and also through the meshing gear surfaces. It is obvious that during normal operation, both clutches are engaged and transmit the input torque to the axle shafts along with the meshing gear surfaces.

The angular disposition of cam contours 80, 72 and 82, 74 is a matter of design but in order to insure desirable operation, the cam angles should be such that when one wheel is rotating faster than the other while making a curve or turn, the clutch cooperating with the slower rotating wheel is in tighter engagement than the clutch cooperating with the faster wheel because of the friction between the cooperating cam surfaces. An exaggeration of this condition would be a locking up of the clutch cooperating with the slower wheel and a complete unlock of the faster wheel, but such a condition is not desirable. This relationship can be best understood by the following example.

When it is desired to negotiate a turn or curve, the outside vehicle wheel moves through a greater linear distance than the inside wheel due to the difference in the radius of curvature of the arcs through which the respective wheels move. Assuming a turn wherein axle shaft 62 is connected to the outside wheel and axle shaft 60 is connected to the inside wheel, both clutches are normally engaged before the turn is negotiated. As the vehicle assumes an arcuate path, cam contour 74 tends to move ahead with respect to cam contour 82, thus tending to unload clutch 97. During this condition, driving pinions 44 and 46 assume a differentiating relationship with both side bevel gears but clutch 96 remains in tighter engagement that clutch 97 due to the friction between the abutting cam surfaces.

It is to be noted that in order to effect engagement of the clutch to the tractive wheel, there must be some resistance to rotation on the tractive wheel side. This slight resistance can be supplied by the normal loading of the bearings due to the vehicle load, but in a very low friction system wherein it is possible to encounter conditions in which practically no resistance is encountered at the load engaging surface, that is, the coefficient of friction is practically "zero," the slight resistance required can be built into the clutch by providing a slight initial drag on the friction surfaces of the clutch. This is accomplished in a variety of ways, such as canting the friction discs 92 and 94, disposing waved springs in the clutch assembly, etc. If there was absolutely no resistance to rotation on the slipping side of the differential, the driving pinions would rotate about the cross pin axis and would not transmit any torque to the side bevel gear on the non-slipping side, thus preventing engagement of the clutch on the non-slipping side. It is obvious, therefore, that only a slight load is needed on the non-slipping side to transmit a small amount of torque to the side bevel on the non-slipping side so that the axial component of force delivered is sufficient to move the side bevel on the non-slipping side into frictional engagement with the housing inner wall and the friction disc disposed therebetween.

When the vehicle is disposed so that one of the driving wheels is on a desirable tractive surface and the other wheel is on a slipping surface, such as snow, ice, grease, etc., driving torque is transmitted to the tractive wheel in the following manner. If axle shaft 62 is connected to the slipping wheel, a slight amount of resistance to rotation is encountered by virtue of inherent friction in the drive train or a built-in preload in the friction clutch. This resistance is sufficient to cause the driving pinions 44 and 46 to transmit a small amount of torque to side bevel gear 75 which in turn is moved into engagement with friction disc 92 due to the cam action between cam contours 80 and 72. As soon as the friction clutch begins transmitting torque to the side bevel gear from housing 12, it is self-energized into more positive engagement with the casing by the cam action between cam contours 80 and 72. It is to be noted that as the condition encountered by the slipping wheel is changed, the amount of torque transmitted to that wheel is correspondingly changed because as the slipping side offers greater resistance, or, in effect, encounters more favorable road conditions, the reactive force of cam contour 72 increases, thus moving side gear 75 into more intimate contact with friction disc 92 and inner wall surface 88.

Figure 3:
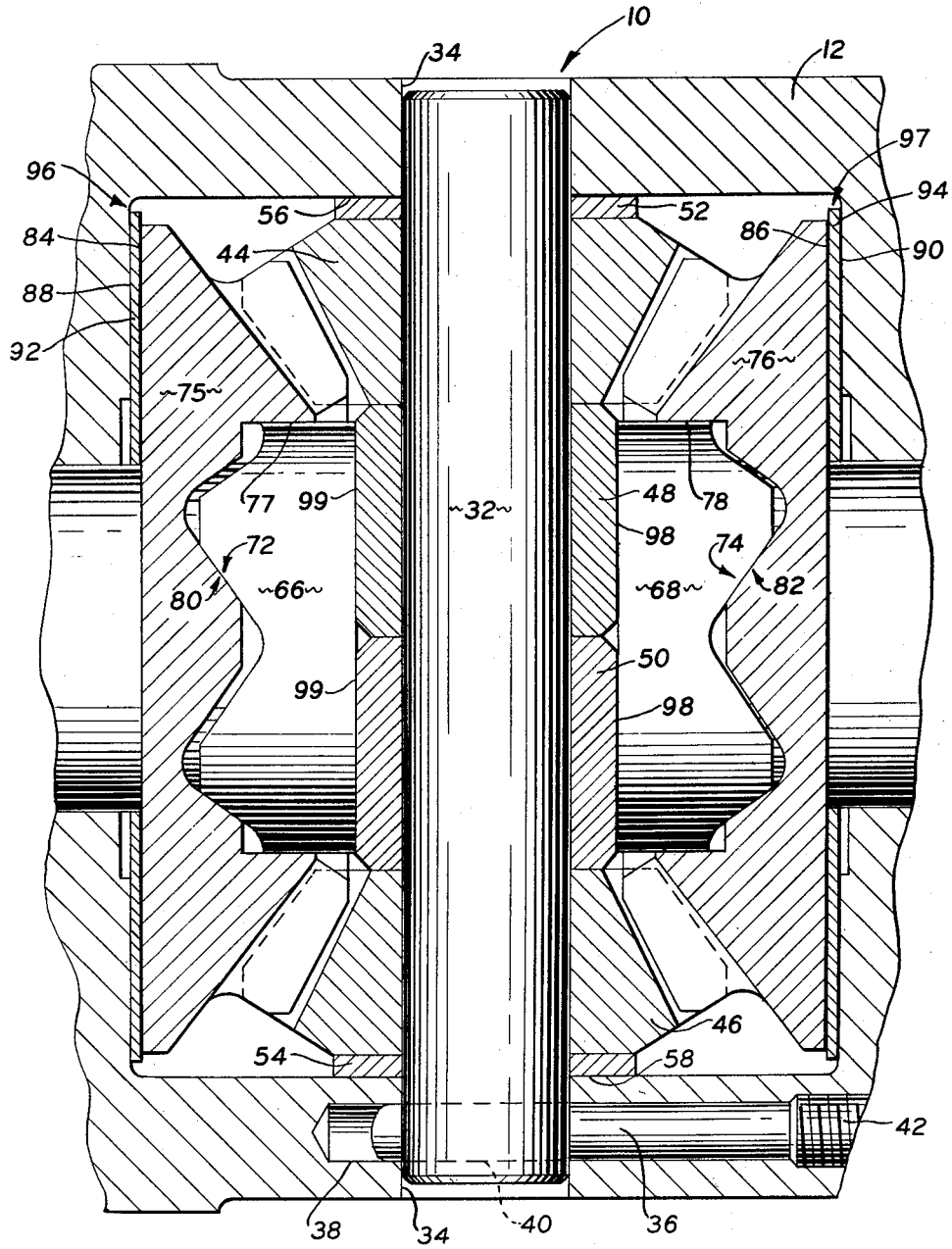
Figure 3 is an enlarged cross-sectional view of the differential device showing the meshing engagement of the gears and the cam and friction surfaces.

It is to be understood that this device operates in an identical manner when input ring gear 30 is rotated in the opposite direction. When operating in reverse, the clearance between cam contours 72, 80 and 74, 82 is on the opposite side of each cam contour than that shown in Figure 3.

This particular novel structural embodiment offers advantages which were heretofore not known in the art. In devices of this type heretofore known, the side gears are moved closer to the driving pinions during clutch engagement rather than away from the driving pinions. This condition resulted in extremely high surface loading of the meshing gear surfaces, thus causing rapid gear wear and excessive noise.

Another novel aspect of this invention is that the reactive cam force is transmitted to spacer sleeves 48 and 50 from cam sleeves 66 and 68. Under normal driving conditions, when both wheels are substantially equal tractive wheels, the reactive forces from both sides of the differential are transmitted to cross pin 32, resulting in merely a compressive force on cross pin 32, eliminating excessive bending moments and shear forces. Also, during relative rotary movement between cam sleeves 66 and 68 and cross pin 32, engaging surfaces for the relative movement are rolling surfaces rather than sliding surfaces; that is, spacer sleeves 48 and 50 rotate with respect to the inner end surfaces of cam sleeves 66 and 68, thus reducing noise and practically eliminating wear.

This structural embodiment contains practically the same number of parts as the conventional differential, the only addition being the cam sleeves interposed between the side bevel gears and the driving axles. This structure is comparable to a conventional differential in weight, simplicity, cost, and life wear and is far superior in performance.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited therefore, only by the broad scope of the appended claims.

I claim:

1. A differential gearing device comprising a differential housing having end wall portions and a lateral wall portion connecting said end wall portions, a cross pin mounted in said lateral wall portion, spaced driving pinions journalled on said cross pin, a pair of spacer sleeves rotatably journalled on said cross pin and disposed intermediate said driving pinions, a pair of spaced driven members journalled in said housing and disposed normal to the axis of said cross pin, cam sleeve means in contact with said spacer sleeves and rotatably connected to said driven members, axially disposed cam surfaces disposed on said cam sleeve means, side gear means journalled on each of said cam sleeves and having toothed portions meshing with said driving pinions, a friction surface provided on each of said side gear means and disposed opposite to said toothed portions, friction surfaces on said housing disposed adjacent said side gear friction surfaces, cam surfaces disposed on said side gear means and cooperating with said cam surfaces on said cam sleeves whereby said side gear means are selectively, drivingly engageable with said housing upon actuation of said cooperating cam surfaces.

2. A device according to claim 1, wherein said cam sleeves react against said spacer sleeves and have rolling contact therewith.

3. A device according to claim 1, wherein said cam sleeves are splined to said driven members.

4. A device according to claim 1 wherein said differential housing is of a unitary one-piece construction having oppositely disposed cutout portions in said lateral wall portion.

5. A differential gearing device comprising a differential housing, a differential pinion mechanism comprising a cross pin carried in said housing spaced driving pinions rotatably mounted on said cross pin, a plurality of reaction members rotatably mounted on said cross pin, side gears driven by said pinion mechanism, separate driving axles driven by said side gears, friction locking devices associated with each of said driving axles comprising friction surfaces associated with each of said side gears and friction surfaces associated with said differential housing, cam means carried by said side gears, cam means carried by said driving axles in operative engagement with said first mentioned cam means, reaction surface portions integral with said cam means carried by said driving axles and disposed in reactive contact with said rotatable reaction members so that rolling contact is established between said reaction surface portions and said rotatable reaction members, and said cam means being operable to selectively move said side gears away from said driving pinions and into driving engagement with said differential housing.

6. In a differential gearing device, a differential housing having a lateral wall portion, spaced end wall portions integral with said lateral wall portion, a cross pin mounted in said lateral wall portion, drive pinions journalled on said cross pin, a pair of spacer sleeves disposed intermediate said drive pinions and rotatably journalled on said cross pin, a pair of spaced axle shafts journalled in said housing and disposed normal to the axis of said cross pin, cam sleeve means in reactive contact with said spacer sleeves and rotatably connected to said axle shaft, axially disposed cam surfaces on said cam sleeve means, side gear means journalled on each of said cam sleeves and having toothed portions meshing with said drive pinions, an annular friction surface provided on each of said side gear means and disposed on a surface remote from said toothed portions, friction surfaces on said housing disposed adjacent said side gear friction surfaces, cam surfaces disposed on said side gear means and cooperating with said cam surfaces on said cam sleeves whereby said side gear means are selectively, drivingly, engageable with said housing upon actuation of said cooperating cam surfaces.

7. In a differential gearing device, a housing, a pinion shaft mounted in said housing, spaced pinions journalled on said pinion shaft, reaction sleeve portions rotatably journalled on said pinion shaft, spaced side gears meshing with said spaced pinions and having cam means disposed thereon, spaced axle shafts having cam means rotatable therewith and cooperable with said cam means disposed on said side gear means and planar surface portions of said axle shaft cam means being in contact with said reaction sleeve portions whereby upon relative axial movement of said cam portions, said planar surfaces react against said reaction sleeves and said pinion shaft.

8. A differential gearing device comprising a differential housing, a cross pin carried by said housing, driving pinions journalled on said cross pin, reaction means rotatably mounted on said cross pin and disposed radially inward of said pinions, driven gear means meshing with said driving pinions, spaced driven members, cam means operably connected with said driven gear means and said driven members, said driven gear means being journalled on portions of said cam means operably connected with said driven members, friction clutching means interposed between said driven gear means and said differential housing, and said cam means being selectively operable to move said driven gear means away from said driving pinions to actuate said friction clutching means and said driven members reacting against said reaction means whereby said driven gear means are operatively connected with said differential housing.

9. In a differential device, a differential housing, a cross pin carried by said housing, driving pinions journalled on said cross pin, driven gear means meshing with said driving pinions, spaced driven members, cam means operably connecting said driven gear means and said driven members, said driven gear means and said differential housing each having adjacent friction portions rotatable therewith, said cam means being selectively operable to move said driven gear means away from said driving pinions and into operable engagement with said differential housing through said friction portions, rotatable reaction members journalled on said cross pin, and said cam means which is connected to said driven member reacting against said rotatable reaction members during engagement of said friction portions.

References Cited in the file of this patent

UNITED STATES PATENTS

| | | |
|---|---|---|
| 1,361,895 | Nogrady | Dec. 14, 1920 |
| 1,431,572 | Dodge | Oct. 10, 1922 |
| 1,556,101 | Goodhart | Oct. 6, 1925 |
| 2,720,796 | Schou | Oct. 18, 1955 |
| 2,769,353 | Nash | Nov. 6, 1956 |